United States Patent [19]

Conley

[11] 3,964,045

[45] June 15, 1976

[54] OPERATOR ALERTING DEVICE

[76] Inventor: Cecil Conley, 9-S-675 Western Ave., Hinsdale, Ill. 60521

[22] Filed: Dec. 9, 1974

[21] Appl. No.: 530,717

Related U.S. Application Data

[63] Continuation-in-part of Ser. No. 280,958, Aug. 16, 1972, Pat. No. 3,861,349.

[52] U.S. Cl. .................................. 340/279; 180/99; 200/DIG. 2
[51] Int. Cl.² ....................................... G08B 21/00
[58] Field of Search .................... 340/279; 180/99; 200/DIG. 2; 116/65, 67 R

[56] References Cited
UNITED STATES PATENTS

| | | | |
|---|---|---|---|
| 1,988,330 | 1/1935 | Pettersson et al. | 340/279 |
| 2,711,528 | 6/1955 | Glossbrenner | 340/279 |
| 2,840,032 | 6/1958 | Reeves | 116/65 |
| 3,049,188 | 8/1962 | Giannetti | 180/99 |

FOREIGN PATENTS OR APPLICATIONS

| | | | |
|---|---|---|---|
| 1,099,823 | 9/1955 | France | 180/99 |
| 465,868 | 9/1951 | Italy | 340/279 |

*Primary Examiner*—Glen R. Swann, III
*Attorney, Agent, or Firm*—Lockwood, Dewey, Zickert & Alex

[57] ABSTRACT

The operator of a motor vehicle is provided with a glove or hand-worn member to which one end of a cord or other flexible member is attached with the other end being attached to the operating member of a switch or the trigger of an attention-producing device mounted to a fixed elevated portion of the vehicle located generally above the steering wheel. The cord or other flexible member is of such length that it is not taut when the operator's hand is in a normal driving position on the steering wheel but becomes taut before the operator's hand drops to his or her thigh. The alarm-producing device may be the horn with which the vehicle is normally equipped and the switch for the horn may be electrically interconnected to the storage battery with which the vehicle is normally equipped. When the operator drowses off or goes to sleep, his or her hand will fall from the steering wheel, but before it reaches the operator's thigh the cord or flexible member will become taut and thereby trigger the attention-producing device or operate the switch which sets off the horn or other electrically energized alarm.

2 Claims, 3 Drawing Figures

OPERATOR ALERTING DEVICE

This application is a continuation-in-part of my prior application co-pending and allowed, Ser. No. 280,958, filed Aug. 16, 1972, now U.S. Pat. No. 3,861,349 and the disclosure thereof is incorporated herein by reference.

SUMMARY OF THE INVENTION

The object of the invention, generally stated, is the provision of a hand-worn safety device for operators of motor vehicles and a suitable alarm or attention-producing system in combination therewith, so that when the operator's hand drops from the wheel on drowsing off or going to sleep, an effective attention-producing alarm is triggered or set off.

More specifically, a primary object of the invention is the provision of means for alerting the operator of a motor vehicle who has drowsed off or gone to sleep which includes a glove or other hand-worn member having one end of a cord or other flexible member connected thereto with the opposite end connected to the trigger of an alarm-producing device or the operating member of a switch, mounted to a fixed portion of the vehicle located generally above the steering wheel with the cord or other flexible member having such a length that it is not taut when the operator's hand is on the steering wheel but becomes taut before the operator's hand drops to his or her thigh.

A further object of the invention is the provision of an alarm producing system of the type described wherein the horn of the vehicle is electrically connected with a switch mounted to a fixed portion of the vehicle located generally above the steering wheel with the operating member of the switch being connected to one end of the cord or other flexible member.

Still a further object of the invention is the provision of a system of the type described wherein the glove has the thumb thereof stitched or otherwise connected to the adjacent index finger so that the thumb of the wearer cannot hook over the steering wheel, thereby retaining the operator's hand on the steering wheel even when he or she has drowsed off.

Certain other objects of the invention will in part be obvious and will in part appear hereinafter.

For a more complete understanding of the nature and scope of the invention, reference may now be had to the following detailed description thereof taken in connection with the accompanying drawings wherein:

DESCRIPTION OF THE PREFERRED EMBODIMENT

Figure 1:
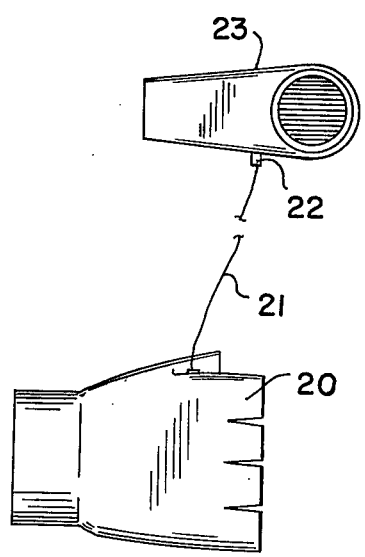
FIG. 1 is a diagrammatic view showing an embodiment of the invention in which there is an alarm or attention-producing device adapted to be mounted to a fixed portion of a motor vehicle generally above the steering wheel, and having the trigger or operating member thereof connected to one end of a cord, the other end of which is connected to the operator's hand-worn member.

Referring to FIG. 1, a safety glove 20 is shown having permanently attached thereto one end of a cord 21, the opposite end of which is attached to the trigger 22 of an electrically operated attention-producing device 23 of known commercial type, for example, the personal protector siren alarm, Model BSAL-1 manufactured by Fedtro, Inc. of New York, New York. This is a battery operated device and upon pulling the pin or trigger 22, the siren is set off instantly.

It will be seen that the siren or alarm device 23 can be mounted to a fixed portion of the vehicle generally above the steering wheel such as to the car's roof to a rear-view mirror, or to one of the sun shades with which a vehicle is normally equipped.

In use, the driver puts his hand in the glove 20 and proceeds to use that hand on the steering wheel to steer it in the normal fashion. Should he drowse off or go to sleep, his hand will fall from the steering wheel and the weight and momentum of the falling hand will be enough to pull the pin or trigger 22 and set off the alarm 23.

The cord or flexible member 21 should be of such length that it is not taut when the operator's hand is on the steering wheel but is short enough so that it does become taut before the operator's hand drops to his or her thigh. This arrangement allows the operator to manipulate the wheel in a normal manner, and to do such other normal things as light a cigarette, put a stick of chewing gum in his mouth, use a handkerchief, etc., without setting off the attention-producing device.

As an alternative to the battery operated siren 23, the cord 21 could be attached to operate some other attention-producing or awakening device such as a gas powered air horn of the type used on small boats. One such device is manufactured by Buell Manufacturing Co. of Lyons, Illinois.

Figure 2:
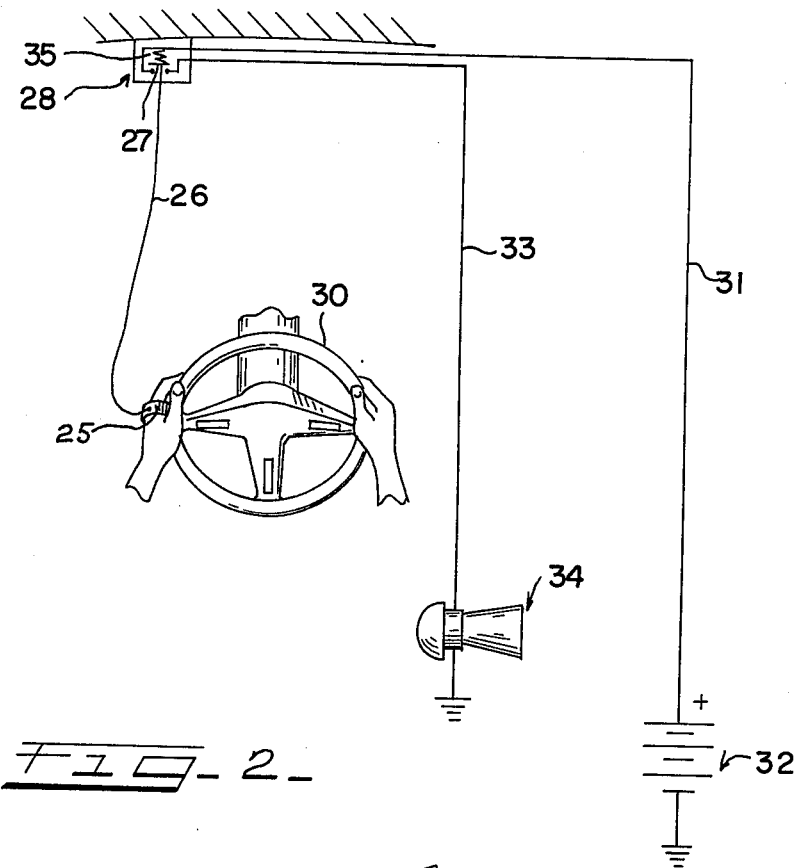
FIG. 2 is a diagrammatic view showing the horn of a motor vehicle and the storage battery thereof connected in circuit relationship with a switch mounted to a fixed portion of the motor vehicle located generally above the steering wheel with the operating member of the switch connected to one end of a flexible cord, the other end of which is connected to a hand-worn member.

In FIG. 2 a second embodiment of the invention is shown wherein a hand-worn member 25 in the form of a loop or band of plastic, fabric, or leather fits over the operator's hand and has attached thereto one end of a flexible cord 26, the other end of which is attached to the operating member 27 of a switch indicated generally at 28. The switch is mounted to a fixed portion of a motor vehicle such as the roof or the upper molding of the windshield or some other place generally above the vehicle's steering wheel 30. It will be seen that one contact of the switch 38 is connected by means of a conductor 31 to the positive terminal of the vehicle's storage battery indicated at 32. The other terminal of the switch 28 is connected by conductor 33 to a terminal of the vehicle horn indicated at 34 which has its other terminal grounded as is the negative terminal of the battery 32. It will be seen that upon closing of the switch member 27 against the contacts of the switch 28, that a circuit will be completed which will energize the horn 34. The switch operating member 27 is normally biased to an open position by means of a tension spring 35 or other means. It will be understood that there are many switches available on the market that can be used for switch 28.

Should the operator drowse off or go to sleep wearing the member 25, the hand will normally fall off the steering wheel 30 and tend to drop to the wearer's or operator's thigh. Before reaching the thigh however, the cord 26 becomes taut and closes the switch 28, thereby energizing the horn 34 and alerting or awakening the operator.

Figure 3:
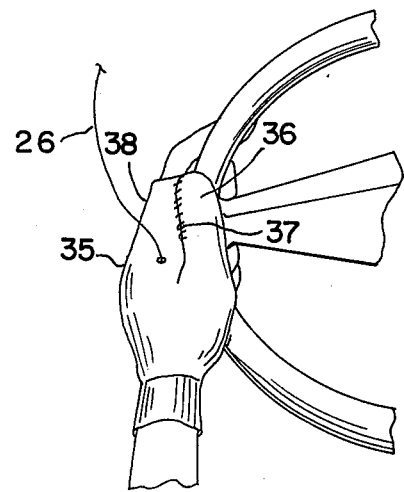
FIG. 3 is a view in which the hand-worn member is a glove having the thumb thereof stitched or secured to the index finger portion.

Normally, the driver or operator when wearing the member 25 should keep his thumb close to the index finger and not allow the thumb to extend over the steering wheel rim, since there is some tendency for the thumb to serve as a hook and interfere with the immediate dropping of the hand to the thigh when the driver drowses off or goes to sleep. In order to eliminate any difficulty in this connection, it is preferred that the operator wear a glove of the type indicated at 35 in FIG. 3 in place of the simple band or loop 25. It will be seen that the thumb 36 of the glove 35 is secured by stitchings 37 to the adjacent side of the index finger portion. This arrangement prevents the wearer's thumb from being separated any appreciable distance from the wearer's index finger and thereby from becoming hooked over the steering wheel rim or any other part thereof. This arrangement serves as an additional safety factor making the system more fool-proof and thus more effective for the purpose intended.

I claim:

1. Means for alerting an operator of a motor vehicle who has drowsed off, comprising, in combination, an attention-producing means including trigger or switch means for setting off the same, means for mounting said attention-producing means on a fixed part of said vehicle generally above the steering wheel thereof, a glove or hand-worn member of the operator's hand, and a cord or other flexible member interconnecting said trigger means and said glove or hand-worn member, said cord or other flexible member having a length such that it is not taut when the operator's hand is on the steering wheel but becomes taut before the operator's hand drops to his thigh and said glove including a thumb-receiving pocket and an index finger-receiving pocket with said pockets being attached to each other in juxtaposed relationship so that the wearer's thumb cannot by itself hook over the rim of the steering wheel.

2. Means for alerting an operator of a motor vehicle who has drowsed off, comprising, in combination, a switch having an operating member, and mounted on a fixed part of said vehicle generally above the steering wheel thereof, an electrically energized attention-producing means electrically interconnected with the storage battery of said vehicle and said switch, a glove or hand-worn member of the operator's hand, and a cord or other flexible member interconnecting said switch operating member and said glove or hand-worn member, said cord or other flexible member having a length such that it is not taut when the operator's hand is on any portion of the steering wheel but becomes taut before the operator's hand drops to his thigh and said glove including a thumb-receiving pocket and an index finger-receiving pocket with said pockets being attached to each other in juxtaposed relationship so that the wearer's thumb cannot by itself hook over the rim of the steering wheel.

* * * * *